US009259106B2

(12) United States Patent
Turcotte

(10) Patent No.: US 9,259,106 B2
(45) Date of Patent: Feb. 16, 2016

(54) REMOVABLE REUSABLE SUPPORT STAND

(71) Applicant: Susan T. Turcotte, Nashville, TN (US)

(72) Inventor: Susan T. Turcotte, Nashville, TN (US)

( * ) Notice: Subject to any disclaimer, the term of this patent is extended or adjusted under 35 U.S.C. 154(b) by 0 days.

(21) Appl. No.: 13/916,352

(22) Filed: Jun. 12, 2013

(65) Prior Publication Data

US 2014/0070071 A1 Mar. 13, 2014

Related U.S. Application Data

(60) Provisional application No. 61/699,629, filed on Sep. 11, 2012.

(51) Int. Cl.

| | |
|---|---|
| ***A47G 1/24*** | (2006.01) |
| ***A47B 97/04*** | (2006.01) |
| ***A47G 1/14*** | (2006.01) |
| *A47F 1/14* | (2006.01) |
| *A47G 1/16* | (2006.01) |
| *B60R 1/02* | (2006.01) |
| *A47F 7/14* | (2006.01) |
| *G09F 1/00* | (2006.01) |
| *G09F 1/10* | (2006.01) |
| *B42D 15/04* | (2006.01) |
| *A47B 97/08* | (2006.01) |

(52) U.S. Cl.

CPC ................. *A47G 1/141* (2013.01); *A47B 97/08* (2013.01); *B42D 15/042* (2013.01); *G09F 1/10* (2013.01); *Y10T 156/1026* (2015.01); *Y10T 156/1064* (2015.01)

(58) Field of Classification Search

CPC ....... A47G 1/141; A47G 1/24; A47G 1/1421; A47G 1/0633; B42D 15/042; B42D 15/045; G09F 1/04; G09F 1/06; G09F 1/00; G09F 15/0068; A63H 33/38; A63H 33/16; Y10T 156/1062; Y10T 156/1051

USPC ............ 248/683, 459, 472; 40/754, 750, 755, 40/124.17, 124.09, 745, 746

See application file for complete search history.

(56) References Cited

U.S. PATENT DOCUMENTS

| | | | | |
|---|---|---|---|---|
| 2,115,448 | A * | 4/1938 | Pradt | 248/459 |
| 2,115,449 | A * | 4/1938 | Pradt | 248/459 |
| 3,222,190 | A * | 12/1965 | Davis | 426/120 |
| 3,707,791 | A * | 1/1973 | Levy | 40/755 |
| 3,828,456 | A * | 8/1974 | Rose | 40/592 |
| 4,014,120 | A * | 3/1977 | Merz | 40/750 |
| 5,868,373 | A * | 2/1999 | Duff | 248/459 |
| 7,150,118 | B1 * | 12/2006 | Benton et al. | 40/610 |
| 7,467,488 | B2 * | 12/2008 | Lee | 40/746 |
| 2006/0005439 | A1 * | 1/2006 | Matsumura et al. | 40/310 |

* cited by examiner

*Primary Examiner* — Syed A Islam
*Assistant Examiner* — Taylor Morris
(74) *Attorney, Agent, or Firm* — Raymond R. Ferrera; Adams and Reese LLP

(57) ABSTRACT

A removable, reusable support stand for generally planar objects such as photographs, cards, signs, compact disc jewel cases or the like is disclosed, which includes a flat card stock formed into a generally triangular shape with a first fold across the base; a slit from fold line to the center of the base of the triangle forming two flaps or attachment tabs that are covered with an adhesive material and are folded along a fold line to expose the adhesive; and is folded along a line from the apex of the triangle to the top of the slit; and which may then be affixed to the back of the generally planar object to be displayed. The stand can generally be removed and repositioned, or affixed to another object to be displayed.

20 Claims, 3 Drawing Sheets

REMOVABLE REUSABLE SUPPORT STAND

FIELD OF THE INVENTION

The present invention relates generally to display and support stands, and in a particular though non-limiting embodiment to a removable, reusable support stand for displaying generally planar objects such as photographs, cards, signs, compact disc jewel cases and other similar objects.

BACKGROUND OF THE INVENTION

Presently known display support stands generally fall into four categories: (1) frames into which the items to be displayed are inserted; (2) easels onto which the items to be displayed are placed; (3) combined placards with integral stands; and (4) foldable rectangular permanent support stands.

Examples of the first category are U.S. Pat. No. 2,061,294 to Stephenson; U.S. Pat. No. 6,460,280 to Haines-Woon; U.S. Pat. No. 5,279,692 to Best; and U.S. Pat. No. 8,074,385 to Wagner. These types of stands are bulky, complicated, and expensive to produce, frequently costing more than the value of the item to be supported and displayed, and are generally manufactured to display only flat objects of a single specific size, such as photographs of a single size.

Examples of the second category include U.S. Pat. No. 4,199,126 to Komendowski, and U.S. Pat. No. 8,100,376 to Ye. This category of support stand is typically comprised of multiple parts, is bulky and expensive to produce, and is not easily foldable flat for shipping and storage.

An example of the third category is U.S. Pat. No. 5,056,250 to Weissleder. This type of stand is not easily used to display successive objects of different sizes and, due to the use of a curvature in the easel, is not adequately strong to support heavier objects, nor is it easily stored in a generally flat configuration for shipment or when not in use.

Examples of the fourth category include U.S. Pat. No. 5,092,555 to Best, and U.S. Pat. No. 5,211,791, also to Best. The '555 patent discloses a support stand formed from a rectangular piece of card stock, requires use of transparent laminate sheets affixed to the front and back of a photograph to be displayed, and does not teach use of the support stand for supporting items other than photographs. Due to use of rectangular support means and use of the laminates, Best '555 can be costly to manufacture.

Best '791 teaches alternate embodiments of a support stand. The first embodiment, like Best '555, requires the use of transparent laminate sheets affixed to the front and back sides of a photograph to be displayed. Essentially, both the Best '555 patent and the first embodiment taught in Best '791 teach constructing a do-it-yourself picture frame. The second Best '791 embodiment teaches collapsing part of the support stand, while still attached to the photograph, to make it flatten against the rear of the photograph for storage or mailing, and then bending it back into place. Such collapsing and bending tends to weaken an essential structural element of the support.

Both the Best '555 and '791 patents teach use of a permanent adhesive for attaching the stand to either the rear laminate sheet or directly to the back of the photograph being displayed. Therefore, attempts to remove any of the Best support stands can damage either the laminate backing or the item being displayed.

SUMMARY OF THE INVENTION

A support stand for displaying a generally planar object is provided, the support stand including an approximately triangular piece of planar card stock; a horizontal score line disposed parallel to a base portion of the approximately triangular piece of planar card stock, with the horizontal score line pressed into the card stock to define an adhesive tab along the base portion, and a vertical score line extending between a point near the horizontal score line and a point near the apex of the stand; a slit formed along a portion of a vertical center line of the card stock, which divides the adhesive tab into two sub-tabs; and an adhesive means affixed to the two sub-tabs, the adhesive means used to attach and remove the support stand from the generally planar object.

In an alternative embodiment, a method of manufacturing a support stand for displaying a generally planar object is provided, the method including forming an approximately triangular piece of planar card stock; forming a horizontal score line disposed parallel to a base portion of the approximately triangular piece of planar card stock, so that the horizontal score line is pressed into the card stock to define an adhesive tab along the base portion, and a vertical score line extending between a point near the horizontal score line and a point near the apex of the stand; forming a slit along a portion of a vertical center line of the card stock, so that the split divides an associated adhesive tab into two sub-tabs; and affixing an adhesive means to the two sub-tabs, with the adhesive means used to attach and remove the support stand from the generally planar object.

DETAILED DESCRIPTION OF SEVERAL EXAMPLE EMBODIMENTS

In a specific though non-limiting embodiment, a simple but sturdy support stand is provided that has been formed from a generally triangular, tri-folded sheet of card stock, and then attached with integral adhesive to any generally planar object. The disclosed configuration causes the object to stand generally upright for display, and remains easily removable from that first object and attached to successive objects of either the same or different sizes.

Unlike the prior art, a single-sized embodiment of the present invention can be used without frames or backing laminates on different sized objects, and can be used on thicker objects such as compact disc jewel cases, or on objects that are slightly curved and are only generally planar. Also unlike the prior art, the present invention can be removed from a displayed object and repositioned on the same or successive objects without causing harm to the objects. Generally, the stand disclosed and claimed herein can also be variably positioned (e.g., on the left or right side of the object as well as in or near a middle point) across the surface area of the displayed object.

The device can be used, for example, to support for display small objects such as place cards, business cards, or similar small planar objects; portrait and landscape photographs of various sizes; greeting cards, holiday cards and similar objects; signs and similar advertising; and other planar objects of varying thicknesses, including those with appreciable thickness such as compact disc jewel cases and the like. Non-planar objects having a noticeable thickness can also be supported, so long as there is a sufficiently generally planar surface on the lower portion of the reverse side of the object for attachment to the stand disclosed herein.

In one embodiment, the stand is formed from a singular continuous sheet of paper, card stock, parchment paper, or any other flat material that will retain a fold when creased, and that will accept an adhesive material on its attachment tabs. Since the stand is made from a single, generally triangular piece of card stock and is manufactured flat, a larger number of pieces can be manufactured from a given quantity of material than is possible in the prior art.

With reference now to the attached figures, a removable support stand is shown, preferably formed from a piece of flat paper or card stock, although parchment paper or plastic may also be used so long as the material to be used may be folded and creased, and then generally hold its folded shape. For simplicity, all such varieties of material suitable for use are referred to hereafter as “card stock”.

Figure 1:
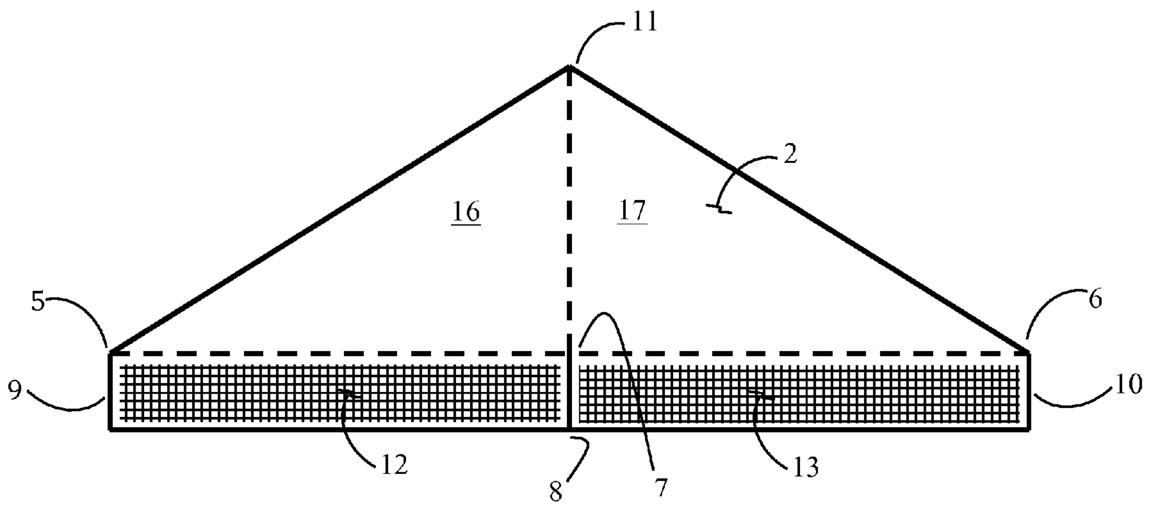
FIG. 1 is a plan view of a first detailed example embodiment, showing the shape, fold lines and adhesive on the attachment tabs.

FIG. 1 is a planar view of a first detailed example embodiment. As seen, the stand can be made by cutting card stock into a generally triangular shape (2). While any type of card stock may be used, it has been found that card stock, cover stock, tag stock or index stock that is 65# or heavier is especially effective. For smaller versions, a lesser weight of card stock may be used. For example, 25# paper or card stock is suitable for making smaller versions of the stand that are suitable for supporting business cards, place cards, or similar small display items.

A first fold line (5)-(6) is scored into the card stock parallel to the base of the triangle.

Fold line (5)-(6) is preferably located at least 15% of the distance from the base of the triangle (8) to the apex (11), although if a stronger type of adhesive is used, as described below, then fold line (5)-(6) could be less than 15% of the distance from the base of the triangle to the apex. A second fold line is scored into the card stock, thereby vertically extending from the apex (11) of the triangle to the center point (7) of the first fold line (5)-(6).

A vertical slit in the triangle is made from the center point of the base (8) to the center point (7) of the first fold line (5)-(6). Fold lines (5)-(6) and (11)-(7) are formed by scoring the card stock, perforating the card stock, or otherwise decreasing the strength of the card stock along the fold lines to facilitate folding of the invention along those fold lines and enhancing the ability of the invention to retain folds made along those lines. When prepared for use, the invention is folded along fold line (11)-(7) such that triangular areas (16) and (17) are folded toward one another.

Attachment tab (9) is folded away from triangular area (16) and attachment tab (10) is folded away from triangular area (17). Although not required, it is preferable that the bottom outermost triangular corners of the triangle (not shown) that would extend past (9) and (10) are cut off vertically from the base of the triangle to the ends of fold line (5)-(6), because in use those small triangular parts would add little functionality to the invention.

Adhesive means (12) and (13) are affixed to attachment tabs (9) and (10) to be used to attach the invention to the object to be displayed. The adhesive means can be any form of adhesive that will adhere to the invention and to the item to be displayed. However, it is preferable that the adhesive means have a higher tack on the side touching the tabs of the invention and a lesser tack on the side intended to attach to and remove from the item to be displayed.

An example of an attachment means with different tack on opposite sides is 3M™ Repositionable Tape #9425, which has high tack adhesive on one side and medium tack adhesive on the opposite side, with the medium tack adhesive initially being covered by a disposable liner or covering tape. Any other adhesive means with differing tack on opposite sides could be used, the intent being that the side of higher tack would be affixed to the invention tabs and the side of lower tack would be used to affix the invention to the object to be displayed, and then to remove the invention and reaffix it to the same item or to other items to be displayed, as desired. Use of differing tacks on the opposite sides of the adhesive means helps to assure that the adhesive means remains affixed to the invention when the invention is removed from one display item for attachment to another display item.

It is also preferable, though not required, that for manufacture, shipping and storage, the side of the adhesive means to be used to affix the invention to the item to be displayed initially should be covered by a removable, disposable non-adhesive covering tape material or pull-off liner, thereby preventing multiple copies of the invention from sticking together when stacked or packaged.

Figure 2:
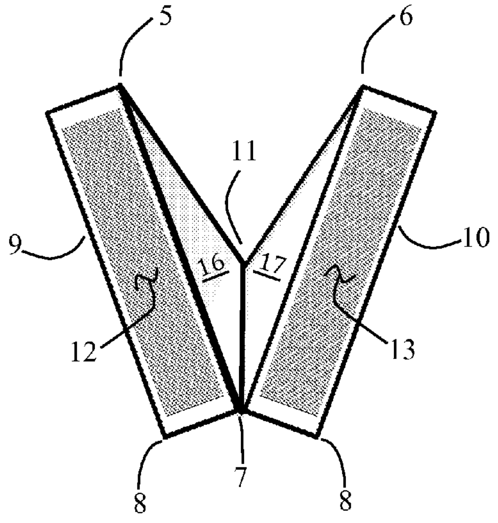
FIG. 2 is a perspective view of a second detailed example embodiment, showing the stand when partially folded for attachment.

FIG. 2 is a perspective view of a second detailed example embodiment. Here, the stand is shown in a partially folded position, with the adhesive means installed on the invention and with the pull-off liner removed from the side of the adhesive means having the lower tack.

Figure 3:
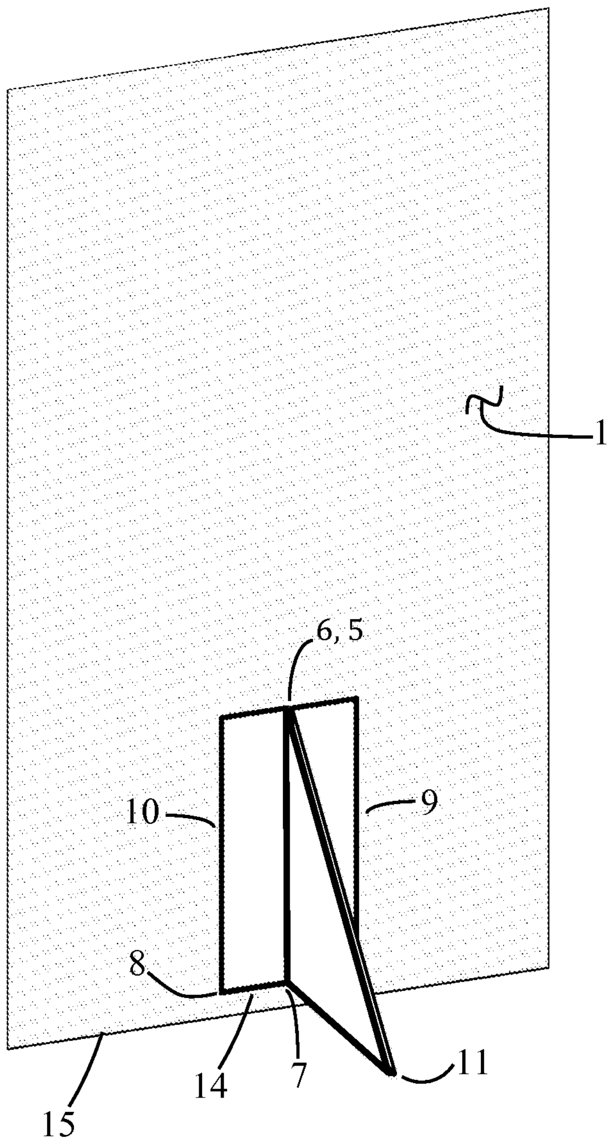
FIG. 3 is a rear perspective view of a third detailed embodiment, showing the stand attached to an item being displayed.

FIG. 3 is a rear perspective view of a third detailed example embodiment, in which the stand is fully folded and attached to the back side of a card, sign, photograph, or other item to be displayed (1). To provide stability to the item to be displayed, it is preferable if the bottom edge of the invention (14), as installed, is affixed to the item to be displayed a small distance above the bottom edge of the item (15), thus providing a slight backward cant or lean to the item being displayed.

Figure 4:
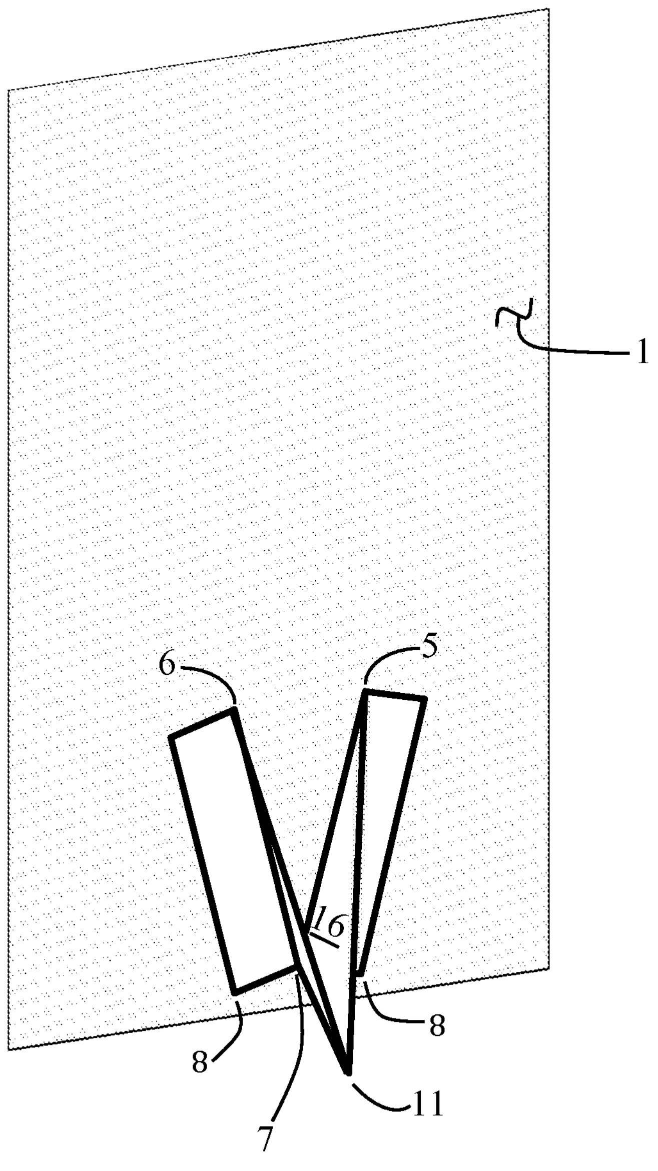
FIG. 4 is a rear perspective view showing a representative method of attaching the stand to an item being displayed.

FIG. 4 is an alternate rear perspective view, in which the stand is partially folded and attached to the item being displayed (1). Using a partial fold along the (11)-(7) line instead of a full fold allows points (5) and (6) to be separated, thereby spreading the horizontal supporting ability of the invention and helping to prevent the item being displayed from curling or bending around its vertical center line.

It is presently contemplated that the stand disclosed herein would normally be packaged and shipped in a flat configuration, with a disposable, non-adhesive covering tape or pull-off liner (not shown) temporarily covering the adhesive means (12) and (13) on the attachment tabs (9) and (10). In use, the stand is folded along fold line (11)-(7), thereby causing triangular area (16) to face triangular area (17). The stand is then folded along fold line (5)-(7) so that adhesive tab (9) is folded away from triangular area (16), and along fold line (6)-(7) so that adhesive tab (10) is folded away from triangular area (17). Any temporary covering or pull-off liner covering the adhesive means is then removed. The stand is then affixed to the item to be displayed by placing the bottom edge of the invention (14) slightly above the bottom edge of the displayed object (15) and pressing the adhesive coated tabs (12) and (13) against the item.

When it is no longer desired to display the item to which the invention is attached, the stand may be removed from that item and affixed to another item to be displayed. Because the adhesive means has higher tack on the side touching the invention and lower tack on the side touching the displayed item, the invention can be pulled easily from the displayed item and the invention will retain the adhesive means for attachment to another item to be displayed.

The stand can be made in various sizes to accommodate different sized objects to be displayed. It has been found that the stand will properly support photographs, cards and other generally planar objects made of card stock or other semi-rigid generally planar materials if the height of the invention from the center point of the base (7) to the apex (11) is one-fourth or more the height of the item to be displayed. Depending on the rigidity of the item to be displayed, versions of the invention shorter than one-fourth the height of the display item may support the item, or a taller version of the invention might be required to provide vertical stability to the item.

While the invention has been described and shown herein with respect to several detailed exemplary embodiments, those of ordinary skill in the pertinent arts will readily appreciate that minor changes to the description, and various other modifications, omissions and additions may also be made without departing from either the spirit or scope thereof.

The invention claimed is:

1. A support stand for displaying a generally planar object, said support stand comprising:

a. an approximately triangular piece of planar card stock having at most two score lines and one slit;

b. a horizontal score line disposed parallel to a base portion of said approximately triangular piece of planar card stock, said horizontal score line pressed into the card stock to define an adhesive tab along said base portion, c. a vertical score line extending between a point near a center point of the horizontal score line and a point near the apex of the stand, said vertical score line defining substantially equal first and second triangular areas;

d. a slit formed along a portion of a vertical center line of said card stock, which divides said adhesive tab into two sub-tabs; and e. an adhesive means affixed to said two sub-tabs, said adhesive means used to attach and remove said support stand from said planar object.

2. The support stand of claim 1, wherein said adhesive means further comprises an adhesive material having a higher tack on a side affixed to said sub-tabs.

3. The support stand of claim 1, wherein said adhesive means further comprises a lower tack on a side attached to a generally planar object.

4. The support stand of claim 3, wherein a removable liner is affixed to said lower tack side of the adhesive means.

5. The support stand of claim 1, wherein said planar piece of card stock further comprises a single continuous piece of card stock and is configured to form at most four contiguous panels.

6. The support stand of claim 1, wherein said adhesive means further comprises a repositionable tape.

7. The support stand of claim 6, wherein said adhesive means further comprises a repositionable tape having a higher tack on a first side, and a lower tack on a second side.

8. The support stand of claim 1, wherein said adhesive is disposed in communication with a removable non-adhesive material, thereby preventing a plurality of proximately disposed support stands from sticking together when stacked or packaged.

9. The support stand of claim 1, wherein said support stand further comprises a folded portion disposed in communication with said generally planar object, thereby lending stability to said support stand when a generally planar object is displayed.

10. The support stand of claim 9, wherein said folded portion is a partially folded portion.

11. A method of manufacturing a support stand for displaying a generally planar object, said method comprising:

a. forming an approximately triangular piece of planar card stock;

b. forming a horizontal score line disposed parallel to a base portion of said approximately triangular piece of planar card stock, so that said horizontal score line is pressed into the card stock to define an adhesive tab along said base portion, c. forming a vertical score line extending between a point near a center point of the horizontal score line and a point near the apex of the stand, said vertical score line defining substantially equal first and second triangular areas;

d. forming a slit along a portion of a vertical center line of said card stock, so that said split divides an associated adhesive tab into two sub-tabs; and e. affixing an adhesive means to said two sub-tabs, said adhesive means used to attach and remove said support stand from said generally planar object;

wherein the planar card stock has at most two score lines and one slit.

12. The method of claim 11, further comprising affixing an adhesive means with a higher tack on a side affixed to said sub-tabs.

13. The method of claim 11, further comprising affixing an adhesive means having a lower tack on a side attached to a generally planar object.

14. The method of claim 13, further comprising affixing a removable liner to said lower tack side of the adhesive means.

15. The method of claim 11, further comprising forming a single, continuous, approximately triangular piece of planar card stock that is configured to form at most four contiguous panels.

16. The method of claim 11, wherein said affixing an adhesive means further comprises affixing a repositionable tape.

17. The method of claim 16, further comprising affixing a repositionable tape having a higher tack on a first side, and a lower tack on a second side.

18. The method of claim 11, further comprising disposing said adhesive means in communication with a removable non-adhesive material, thereby preventing a plurality of proximately disposed support stands from sticking together when stacked or packaged.

19. The method of claim 11, further comprising disposing a folded portion of said support stand in communication with said planar object, thereby lending stability to said support stand when a generally planar object is displayed.

20. The method of claim 19, further comprising disposing a partially folded portion of said support stand in communication with said generally planar object.

* * * * *